April 7, 1970 G. M. STEPHENSON 3,504,828

METHODS AND APPARATUS FOR CLEANING TAPE RECORDER TRANSDUCER HEADS AND SIMILAR DEVICES

Filed July 14, 1966 2 Sheets-Sheet 1

INVENTOR.
George M. Stephenson
BY Robert H. Ware
ATTORNEY.

INVENTOR.
George M. Stephenson
BY
Robert H. Ware
ATTORNEY.

United States Patent Office 3,504,828

Patented Apr. 7, 1970

3,504,828

METHODS AND APPARATUS FOR CLEANING TAPE RECORDER TRANSDUCER HEADS AND SIMILAR DEVICES

George M. Stephenson, Georgetown, Conn. (% Miller-Stephenson Chemical Company, Inc., Rte. 7, Danbury, Conn. 06810)

Filed July 14, 1966, Ser. No. 565,172
Int. Cl. B65d *83/00*
U.S. Cl. 222—402.24 6 Claims

ABSTRACT OF THE DISCLOSURE

Portable cleaning apparatus for dislodging and removing accumulated deposits of foreign matter from tape recording transducer heads and the like, utilizing an Aerosol container carrying a pressurized charge of volatile organic solvent and a liquified Aerosol propellant, and incorporating an aerosol release valve with a discharge nozzle communicating with an enlarged hollow valve stem chamber connected to the interior of the Aerosol container by an internal metering orifice substantially larger than the discharge nozzle, providing a heavy stream of rapidly moving solvent fluid capable of dislodging and sluicing away accumulated deposits of oxide, dirt and other materials.

This invention relates to techniques for removing accumulations of oxide particles and other deposited foreign matter from sensitive electrical devices such as tape recorder transducer heads, and particularly to methods and apparatus for dissolving and sluicing away such deposits from an affected area without damage to the mechanical or electrical components in the vicinity.

PRIOR ART

Accumulations of oxide powder particles, moisture, grease, dust or other foreign matter periodically build up on the recording face of tape recorder transducer heads at the point where the recording tape moves in sliding contact with the head, and particularly at the "point of tangency" or initial and final contact of the tape with the recording face of the recording head. Such accumulations of foreign matter introduce noise and discontinuities in signal strength in the electrical signals recorded on or reproduced from the tape by the transducer head. In sound recording, these discontinuities produce audible noises, and in television tape recording they may produce visible "snow" or other defects in the television image.

Conventional techniques for removing deposits of metallic oxide powder and other foreign matter accumulated on tape recorder transducer heads require that the operator employ a delicate camel's hair brush, a swab, a piece of fine polishing cloth or some other solid object to detach the accumulated foreign matter and physically impel it across and off the recording face of the transducer head. Such conventional techniques involve possible risk of damage to the delicate mechanisms involved or to the extremely thin recording tape. Moreover, the length of time required for such periodic cleaning of transducer heads and the necessity for interrupting normal recorder operation to permit cleaning are serious disadvantages.

Accordingly, a principal object of the invention is to provide methods and apparatus for fast convenient removal of accumulated foreign matter from tape recorder transducer heads and other delicate devices.

Another object of the invention is to provide such methods and apparatus capable of physically removing accumulated foreign matter without affecting associated devices.

A further object is to provide such methods and apparatus for removing foreign matter which may be used for cleaning a tape recorder transducer head during operation of the tape recorder.

Other and more specific objects will be apparent from the features, elements, combinations and operating procedures disclosed in the following detailed description and shown in the drawings, in which.

Figure 1:
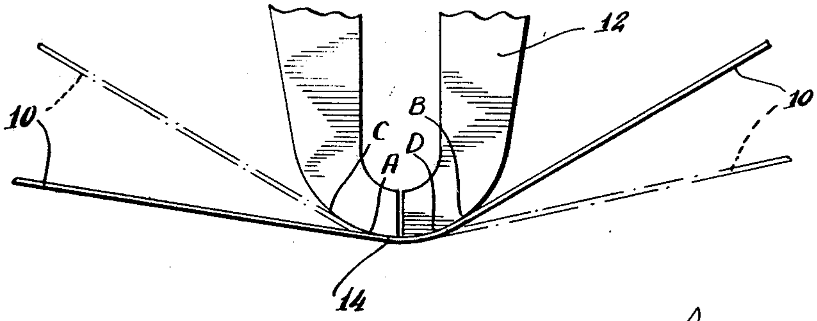
FIGURE 1 is a fragmentary top plan view of a tape recorder transducer head, showing a passing recording tape moving in sliding contact therewith.

I have now discovered that the foregoing and related objects can be readily attained by a method including the steps of packaging a compatible volatile organic solvent with a propellant to provide a reservoir of solvent under high pressure, with the solvent being selected so as to be compatible with the material of the transducer heads to be cleaned and with its surrounding structure and also with the material of the tape passing the transducer head. Preferably the solvent should have a boiling point above about 50° Fahrenheit but below about 81° Fahrenheit so as to be liquid upon discharge from the reservoir and so as to vaporize readily at normal ambient temperatures. The pressurized solvent is discharged from the reservoir in the form of a rapidly moving stream of liquid solvent directed at the accumulated deposit of foreign material on the transducer head; this rapidly moving liquid stream loosens, dislodges and carries away the foreign material from the accumulation zone. After removal of the foreign material from the surface being cleaned, the solvent and the removed material flow by gravity onto underlying surfaces and the solvent thereafter readily evaporates, leaving the foreign material behind for subsequent removal by wiping or other suitable techniques.

VOLATILE ORGANIC SOLVENTS

The cleaning method and apparatus of the present invention employ conventional volatile organic solvents which are compatible with the materials of the transducer heads to be cleaned and the surrounding structures, as well as with the material of the tape which is fed past the transducer head. The solvent should have a boiling point above about 50° Fahrenheit but below about 85° Fahrenheit so as to be liquid upon discharge onto the surface of the transducer head and should vaporize readily at ambient temperatures. It will be appreciated that such a solvent may actually have a boiling point somewhat below ambient temperatures and still be effective in providing a liquid stream as intended by the present invention when the conditions of operation produce discharge of the solvent at a temperature below its boiling point. As is well known, the expansion of the liquefied propellant gas will produce a chilling effect upon the solvent so that its temperature may be reduced below the boiling point for a period sufficient to effect the desired liquid scrubbing, sluicing and cleaning action. However, the preferred solvents are those having a boiling point of about 60° to 80° Fahrenheit.

Such solvents are generally halogenated methyl or ethyl compounds and, more particularly, fluorochloromethanes and ethanes. Particularly advantageous results have been obtained by use of trichlorotrifluoroethane sold by E. I.

du Pont de Nemours & Company under trademarks "Freon TF" or "Freon 113."

Such halogenated hydrocarbon solvents are recommended for cleaning electric motors and many other devices and are described in U.S. Patents 2,999,815, 2,999,817 and 3,129,182 wherein they are mixed with other materials for particular purposes.

PROPELLANTS

The volatile solvent is pressurized within the reservoir by a highly volatile propellant which is compatible therewith and which is gaseous at ambient temperature. Accordingly, upon opening of the reservoir to the atmosphere, the propellant rapidly expels the solvent from the reservoir through the discharge orifice in a steady, high-velocity liquid stream. Generally, such propellants are liquefied halogenated hydrocarbons such as dichlorodifluoromethane and chlorodifluoromethane. Such halogenated hydrocarbon propellants are well known in the art of aerosol packaging, and various products therefor are sold by E. I. du Pont de Nemours & Company under the trademark "Freon," by Allied Chemical Company under the trademark "Genetron" and by Union Carbide Company under the trademark "Ucon." Dichlorodifluoromethane, which has a boiling point of −21.6° centigrade, has been found highly advantageous for purposes of the present invention.

Generally, the solvent and propellant are provided in a solvent to propellant ratio of about 2 to 4:1 and preferably about 3:1, the ratio depending upon the propellant and pressure desired. It has been found that a pressure of about 700 to 1200 p.s.i. should be provided, and preferably the pressure within the reservoir is about 900 p.s.i.

Although Aerosol packaging of many materials heretofore has led to Aerosol packaging of organic solvent liquids such as the halogenated hydrocarbons, these solvents have been packed and sold in Aerosol cans incorporating only very fine orifices or "metering" apertures, producing a fine misty spray of the solvent material. Such a spray mist serves to deliver the material to the desired location, but it arrives in such finely divided droplets that it merely adheres in a film to the deposited, accumulated foreign matter. These highly volatile solvents dry so quickly in air that aerosol-delivered mists have been altogether unsatisfactory for such uses as the cleaning of accumulated foreign material from tape recording transducer heads, unless brushes, swabs or other physical objects were also used.

However, in the present invention, these non-toxic and highly volatile organic solvents provide effective transducer head cleaning action without the use of further tools when they are delivered in large volume and at high velocity, striking the accumulated particles with enough force to dislodge them from any accumulated grease or moisture on the surface of the transducer head, with the surface simultaneously being sluiced by solvent liquid, drops or droplets having sufficient volume and velocity to dissolve the accumulated grease or moisture and wash away such loosened particles. To achieve this end, I have discovered that substantially larger-than-normal delivery orifices or metering orifices incorporated in the Aerosol dispensing valve surmounting the standard Aerosol can are required to release liquid streams of the solvent fluids having a volume and velocity sufficient to provide effective cleaning action.

Figure 2:
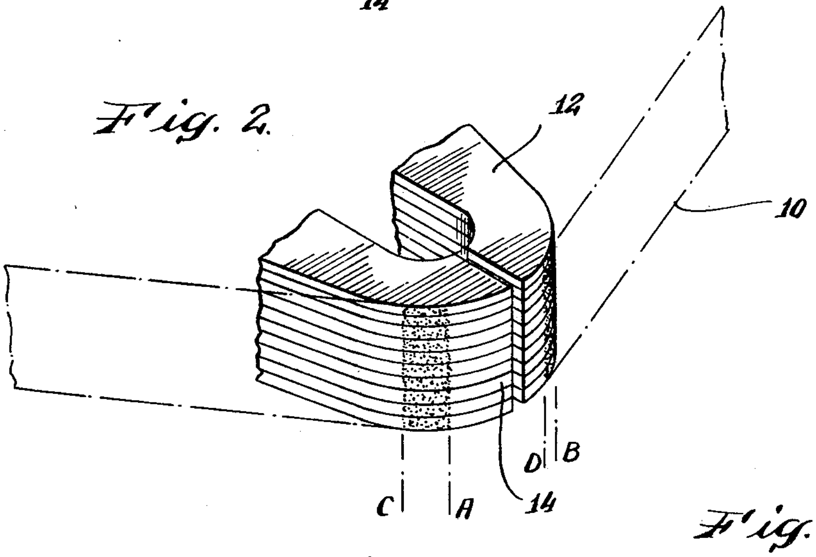
FIGURE 2 is a fragmentary perspective view of the head and tape shown in FIGURE 1.

As shown in FIGURES 1 and 2, standard recording tape passing a transducer head wipes a changing area of the head's contact surface during its passage from the storage reel to the take-up reel.

In FIGURE 1, the recording tape 10 is shown in solid lines passing the face of a transducer head 12. Tape is shown in solid lines in FIGURE 1 at the beginning of its use, when the storage reel, assumed to be on the left side of the transducer head 12, has a large effective diameter from which the tape is unrolled, while the take-up reel on the right hand side of the head 12 has a small effective diameter. At the beginning of its cycle, the tape thus wipes a region between tangent lines A and B around the curved contact surface 14 of the head 12; at the arrival tangent line A, particles of metallic oxide are often deposited by the arriving tape on the contact surface 14 of transducer head 12. In addition, the abrasion between the head and the tape passing in sliding contact with the face 14 often loosens and dislodges additional particles of metallic oxide, which will be left by the tape at the departing tangent line B on face 14.

The magnetic recording tape 10 passing the head 12 is shown in dash lines in FIGURE 1 at the end of its recording or playback cycle when the effective diameter of the storage reel has been reduced and the effective diameter of the take-up reel has been enlarged. In this condition the arrival or initial line of tangency has moved around face 14 to the position C, while the departing line of tangency has moved in the same direction to the point D.

Deposit of oxide particles at and near the tangent lines continues throughout the recorder's operation, with continuous passage of the tape in abrasive contact with the face 14 of transducer head 12. This is indicated in FIGURE 2, where a "tangent zone" on each side of the transducer head 12 often acquires an accumulated build-up of oxide particles, grease, moisture, dust and other materials, seriously reducing the effectiveness of the recording system. Camel's hair brushes or swabs soaked in solvent solution have been required in the past to provide scrubbing contact with such accumulated build-ups of foreign material in order to remove them effectively and restore the recording face 14 of the transducer head 12 to its maximum effectiveness.

THE CLEANING OPERATION

Figure 3:
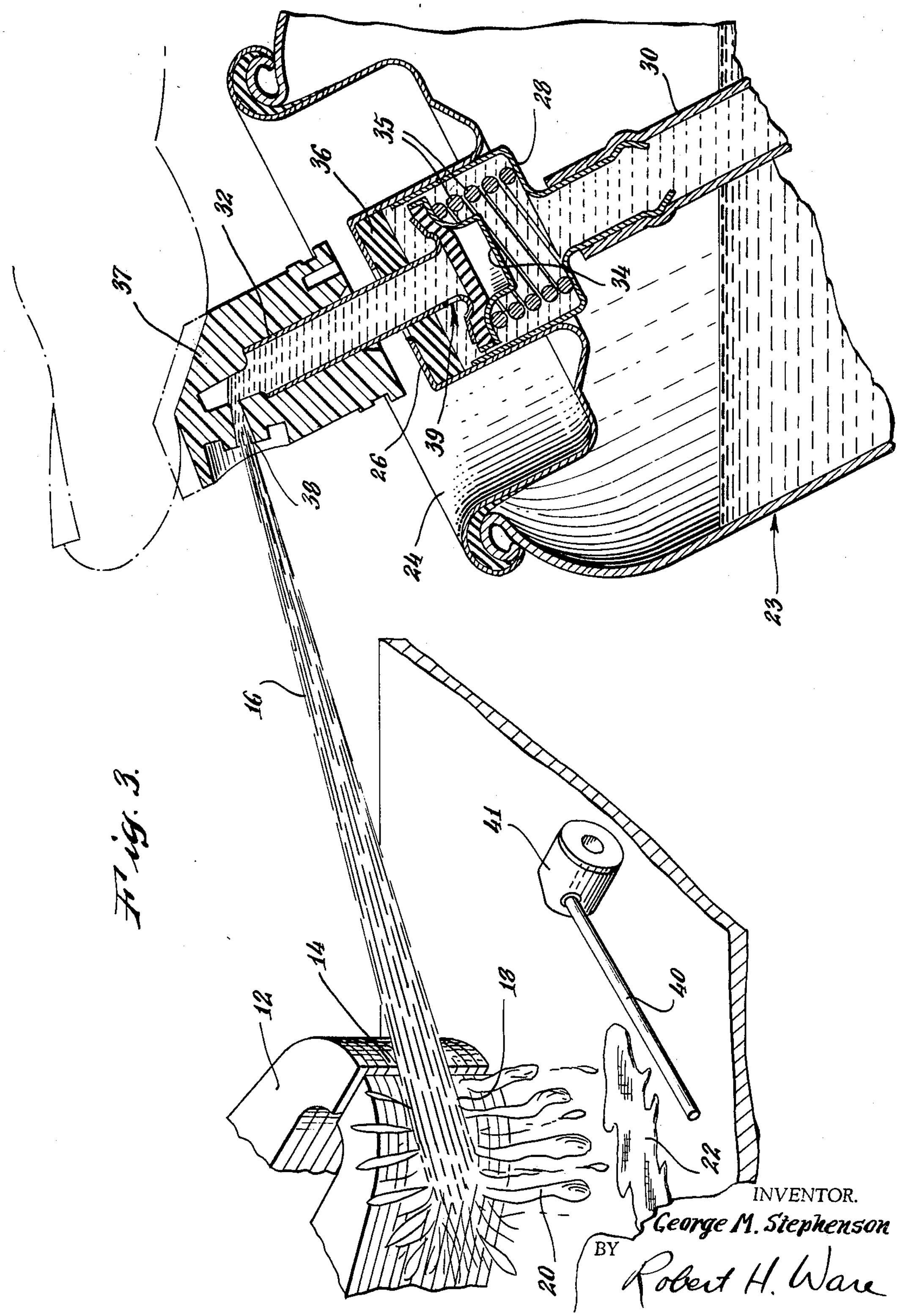
FIGURE 3 is a corresponding enlarged fragmentary perspective view of the head showing methods and apparatus of the present invention used therewith.

With the systems and devices of the present invention, as indicated in FIGURE 3, a quantity of highly volatile liquid solvent traveling at high velocity is directed to strike the recording face 14 of transducer head 12. The liquid solvent arriving at high velocity strikes and dislodges the accumulated particles of dust or metallic oxide, and dissolves any associated films of grease or moisture. At the same time the liquid solvent sluices and washes away these loosened and dissolved materials, draining them completely from the area being cleaned. Thus, as shown in FIGURE 3, the stream 16 of liquid solvent is released at high velocity, directed to impinge on the recording face 14 of the head 12, and particularly across the tangent zones where foreign material build-ups have accumulated as indicated in FIGURE 2.

The loosening and dissolving action occurs at the location 18 where the solvent 16 impacts upon the recording face 14. A sufficient volume of solvent liquid descending from this point of impact 18 to run down and drop off the recording face 14, sluices off and carries away all such loosened and dissolved fine material, as shown at draining zone 20 in FIGURE 3. These suspensions of the loosened foreign material are thus drained from the recording face 14 by the descending stream of solvent liquid 20. This draining stream is carried to the tape deck at point 22, where the highly volatile solvent liquid evaporates, leaving the removed foreign material at a point where it can do no harm and will not interfere with the mechanical or electrical characteristics of the tape recording system.

Figure 4:
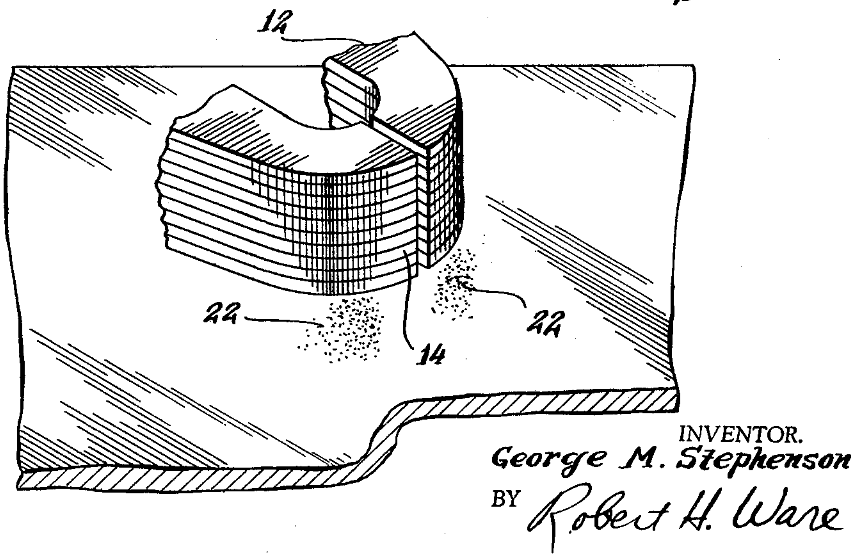
FIGURE 4 is a corresponding perspective view of the head after the completion of the cleaning operation.

Thus, as shown in FIGURE 4, the recording face 14 of transducer head 12 is entirely clear after such a cleaning operation, and any removed foreign material is deposited at point 22 on the tape deck underlying the transducer head 12 where it may accumulate and eventually may be wiped away by the operator if desired.

The Aerosol dispensing valve assembly found most effective in releasing a satisfactory high velocity and high volume stream 16 of liquid halogenated hydrocarbon solvent is shown sealed on an Aerosol container 23 in the fragmentary section at the right hand side of FIGURE 3. In this view, the concavely dished can top 24 is provided with a raised upstanding central valve boss 26 having a stepped conduit 28 secured therein and provided with an elongated dip tube 30 extending to the bottom of the Aerosol can. A hollow tubular plunger stem 32 extends through a suitable gasketed opening in the top of the valve boss 26, with its lower end flanged outwardly and engaging a gasketed sealing piston 34 biased by a compression coil spring 35 seated in the stepped conduit 28 to urge the flanged plunger into sealing engagement with the sealing gasket 36.

A hollow dispensing actuator 37 with a lateral constricted dispensing orifice or nozzle 38 surmounts the open end of the valve stem 32, providing directional guiding for the stream of liquid released by the assembly. The flanged lower end of plunger stem 32 is provided with at least one generally radial metering orifice 39 joining the interior of stem 32 with the space between gasketed sealing piston 34 and the boss gasket 36, and thence via dip tube 30 to the interior of the Aerosol container 23.

When the dispensing actuator 37 surmounting the tubular valve plunger stem 32 is depressed by the user to rock or move the plunger 32 downwardly against the force of the compression coil spring 35, the pressure of the compressed propellant inside the Aerosol container 23 drives the liquid material therein up the dip tube 30, through the stepped conduit 28, around the piston 34 and through the metering orifice 39 into the hollow chamber within tubular valve stem plunger 32, from which it travels through the dispensing orifice 38 to form the high velocity stream 16.

I have discovered that conventional Aerosol metering orifices 39 having diameters between 0.0136 inch and 0.0160 inch, smaller than the conventional dispensing orifice of 0.0180 inch, produce only fine mist sprays, incapable of dispensing "Freon" liquid solvents in the volumes and velocities sufficient for effective cleaning of tape recording transducer heads as set forth herein. However, by use of a much larger metering orifice 39 having diameter of approximately 0.0250 inch, nearly 1½ times the diameter of the standard dispensing orifice 38 and with more than twice its area, in cooperation with an Aerosol propellant loaded under a pressure in the neighborhood of 900 p.s.i., a stream of solvent is released which produces highly effective and completely satisfactory cleaning action for all standard tape recording transducer heads.

The enlarged hollow chamber within valve stem 32 joining metering orifice 39 with dispensing orifice or nozzle 38 provides a flow-arresting storage space for the next released charge, assuring an ample volume of solvent liquid to dislodge and sluice away accumulated deposits.

The substantial open internal volume of the hollow plunger stem 32 provides an intermediate expansion chamber, reducing the chilling effect and the spray mist forming tendency of the pressure drop attending the release of the highly compressed Aerosol contents dispensed into the atmosphere when this pressure drop occurs in a single step. Furthermore, the large metering orifice 39 allows the solvent fluid to flood into stem 32 in volumes sufficient to provide the high volume stream 16 required for satisfactory cleaning of recording heads.

The use of substantially pure compatible halogenated hydrocarbon solvent liquids is desirable because these pure liquids vaporize completely after use, and they are non-toxic, substantially odorless, and non-corrosive Trichlorotrifluoroethane is particularly useful since it is entirely compatible with polyester and vinyl acetate recording tapes and with all standard magnetic tape recording transducer head and tape deck materials presently known to be used. The high velocity stream 16 causes no damage whatever to tape recorder heads or to recording tape, and the cleaning methods of this invention may be used if desired while the tape recorder is running and while the tape is actually in recording or playback contact with recording contact face 14 of the transducer head 12.

A 16 ounce net weight of the preferred solvent and propellant materials fills a convenient-size Aerosol container, and is highly effective if it comprises 75 percent or 12 ounces of trifluorotrichlorethane, and 25 percent or 4 ounces of dichlorodifluoromethane. These materials are customarily delivered to the filling operation at room temperature of about 65 degrees Fahrenheit; the liquid solvent is delivered from its liquid storage tank at a low pumping pressure of 2 to 3 p.s.i.g., while the propellant gas is delivered from its pressure storage tank at a delivery pressure in the neighborhood of 70 p.s.i.g. During the filling operation, the propellant gas is compressed to a pressure in the neighborhood of 900 p.s.i. and both the active solvent and the propellant pass through a final filtration medium of about 5-micron size to assure the substantial purity of the product dispensed from the Aerosol container. After filling and capping the Aerosol container, the compressed propellant is in a liquid phase intermixed with the normally liquid solvent. After filling, the purity of the material is tested by spraying it on clear glass, and quality control checks assuring a purity of 2 parts per million of foreign matter are highly desirable.

The valve illustrated in FIGURE 3 is an Aerosol Research Corporation K–38 valve with a 0.0250 inch diameter metering orifice 37, a standard 0.0180 inch dispensing orifice 38, and a 6¼ inch dip tube 30.

For localized application of the high velocity stream 16 and for delivering it to areas that are difficult to reach, a spray tube 40, 6 inches long, for example, may be mounted in an alternate actuator tip 41 which may be substituted for the actuator 37 surmounting the hollow delivery plunger stem 32. In many instances, however, the use of a long spray tube produces enough internal wall friction to retard the stream 16 substantially, and for the highest velocity applications the actuator 37 with an open delivery orifice 38 is preferred.

I claim:

1. Portable apparatus for dislodging and removing accumulated deposits of foreign matter from an accumulation zone on tape recording transducer heads and like devices comprising, in combination:

(A) an Aerosol container having a manually-actuated release valve incorporating
  (1) a discharge nozzle outlet,
  (2) an internal metering orifice
    (a) substantially larger than and having a cross sectional area at least double that of the discharge nozzle,
    (b) exposed to the interior of the container and connected by conduit means to the lower portion thereof, and
    (c) forming a zone having the minimum cross-sectional area in the discharge path that leads from the interior of the container to the discharge nozzle outlet, and
  (3) an enlarged hollow chamber connecting the orifice with the nozzle outlet for delivery therethrough of fluid material from the interior for discharge through the nozzle outlet, and
(B) a pressurized charge loaded in the interior of the container including
  (1) a volatile organic solvent compatible with the material of the transducer head to be cleaned and its surrounding structure and with the recording tape employed therewith, said solvent having a boiling point of about 50° to 85° Fahrenheit and being readily volatile at embient temperatures; and
  (2) a liquified Aerosol propellant.

2. The combination defined in claim 1 wherein the volatile solvent is a halogenated methyl or ethyl compound.

3. The combination defined in claim 1 wherein said volatile solvent is selected from the group consisting of chlorofluoromethanes and chlorofluoroethanes.

4. The combination defined in claim 1 wherein said volatile solvent is trichlorotrifluoroethane.

5. The combination defined in claim 1 wherein said propellant is a liquefied halogenated hydrocarbon.

6. The combination defined in claim 1 wherein said solvent and said propellent are delivered to the aerosol container at a pressure of about 700 to 1200 p.s.i. and in a ratio of about 2 to 4:1.

References Cited

UNITED STATES PATENTS

| | | | |
|---|---|---|---|
| 2,932,432 | 4/1960 | Beard | 222—402.2 |
| 3,161,330 | 12/1964 | Sagarin et al. | 222—402.2 X |
| 3,161,460 | 12/1964 | Huber | 222—402.24 X |
| 3,240,430 | 3/1966 | Diamond | 222—402.20 X |
| 3,295,727 | 1/1967 | Kates et al. | 222—394 |
| 3,160,182 | 12/1964 | O'Donnell | 222—402.24 X |

OTHER REFERENCES

Freon Technical Bulletin B–2, Copyright 1962, Dupont, pages 1, 4 and 6.

STANLEY TOLLBERG, Primary Examiner

PO-1050
(5/69)

UNITED STATES PATENT OFFICE
CERTIFICATE OF CORRECTION

Patent No. 3,504,828 Dated April 7, 1970.

Inventor(s) GEORGE M. STEPHENSON

It is certified that error appears in the above-identified patent and that said Letters Patent are hereby corrected as shown below:

| | | | | |
|---|---|---|---|---|
| Column | 2 | Line | 30 | change "81o" to --185o-- |
| " | 2 | " | 53 | change "85o" to --185o-- |
| " | 2 | " | 68 | change "80o" to --180o-- |
| " | 6 | " | 72 | change "85o" to --185o-- |

Signed and sealed this 30th day of May 1972.

(SEAL)
Attest:

EDWARD M.FLETCHER,JR.
Attesting Officer

ROBERT GOTTSCHALK
Commissioner of Patents